United States Patent
Purohit et al.

Patent Number: 5,133,792
Date of Patent: Jul. 28, 1992

[54] PROCESS FOR REFINING DIAMONDS

[75] Inventors: Ankur Purohit; Ahnal A. Purohit, both of Darien, Ill.

[73] Assignee: Anshal, Inc., Darien, Ill.

[21] Appl. No.: 662,469

[22] Filed: Feb. 28, 1991

[51] Int. Cl.⁵ .................. B01J 3/04; B08B 3/08; B08B 3/10; B28D 5/04

[52] U.S. Cl. .................. 134/26; 134/19; 134/28; 134/29; 134/30; 134/42; 125/39; 252/95; 423/446

[58] Field of Search .................. 125/39; 423/446; 134/26, 28, 29, 30, 42, 19; 252/95

[56] References Cited

U.S. PATENT DOCUMENTS

| | | | |
|---|---|---|---|
| 2,643,661 | 6/1952 | Shanahan, Jr. | 134/26 |
| 2,667,434 | 1/1954 | Strandberg | 134/42 |
| 2,961,356 | 11/1960 | Breese et al. | 134/28 |
| 4,339,281 | 7/1982 | Chio | 134/26 |
| 4,608,226 | 8/1986 | Lauvinerie et al. | 125/39 |

FOREIGN PATENT DOCUMENTS 3303806  5/1987  Japan .................. 423/446

Primary Examiner—Theodore Morris
Assistant Examiner—Zeinab El-Arini
Attorney, Agent, or Firm—Charles F. Lind

[57] ABSTRACT

The invention teaches a deep boiling process for refining diamonds, be they raw or cut and polished. The process provides for initially precleaning the diamonds with solvents including alcohol, acetone, sulfuric acid, hydrogen peroxide, and/or water, to remove surface oils, hydrocarbons and other common surface impurities therefrom. The process then provides the use of separate sealed vessels wherein the diamonds are respectively submerged in strong caustic and acid solvents, and heated to between 220° and 500° C. with associated high vaporous pressures, for durations of possibly more than a day. The caustic solvent comprises potassium hydroxide and/or sodium hydroxide and possibly also potassium nitrate, and breaks down and removes the "glassy" structures and other complex oxides in the diamonds; while the acid solvent comprises Aqua Regia [hydrocholoric acid and nitric acid] and possibly also sulfuric acid, and removes metallic traces in the diamonds by forming water soluble chlorides and nitrates. The diamonds are rinses, between exposures to the caustic and acid solvents and after the last exposure to either, with solvents including water, acetone and/or alcohol.

Vessels suited to preform this process are also disclosed.

16 Claims, 2 Drawing Sheets

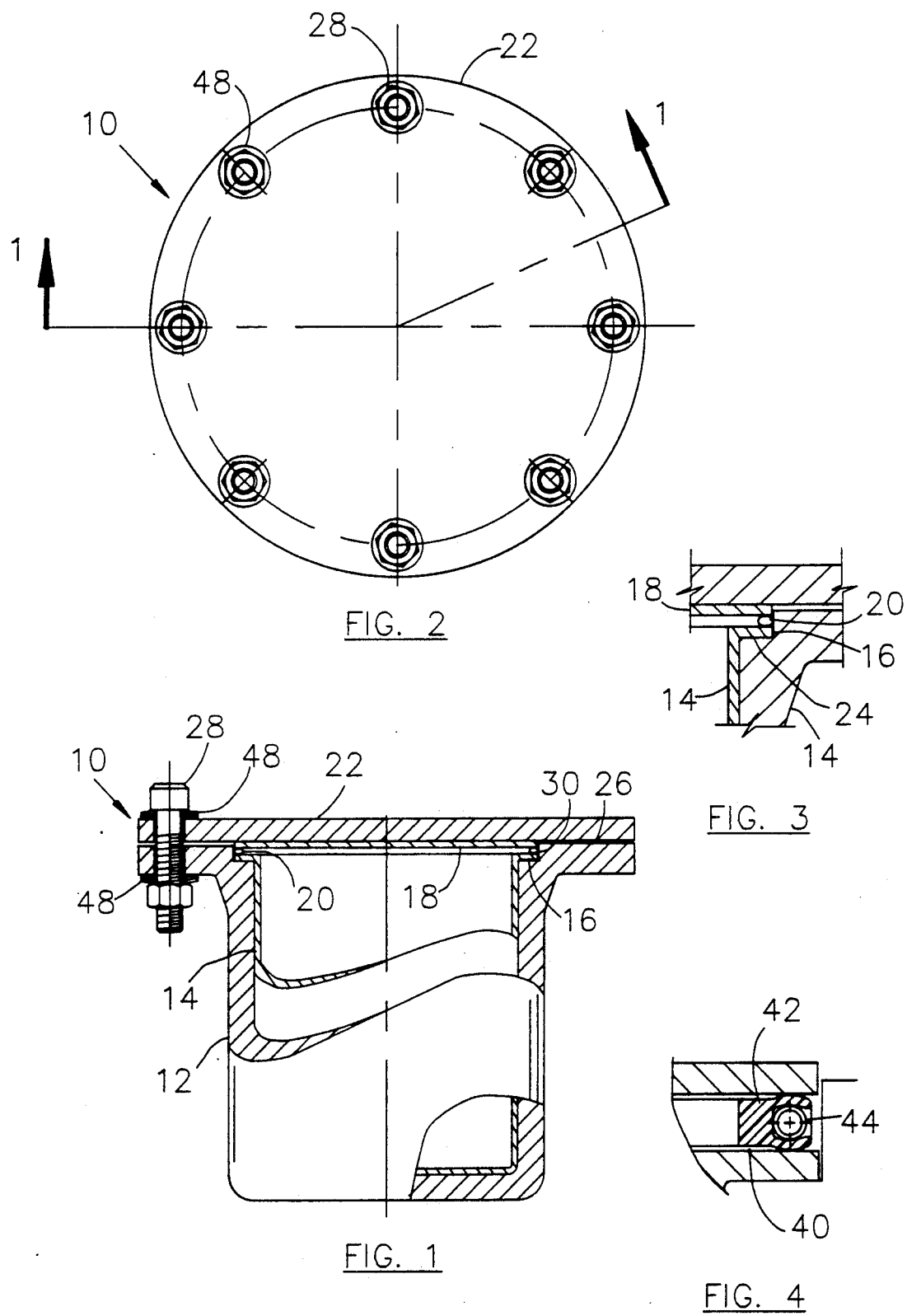

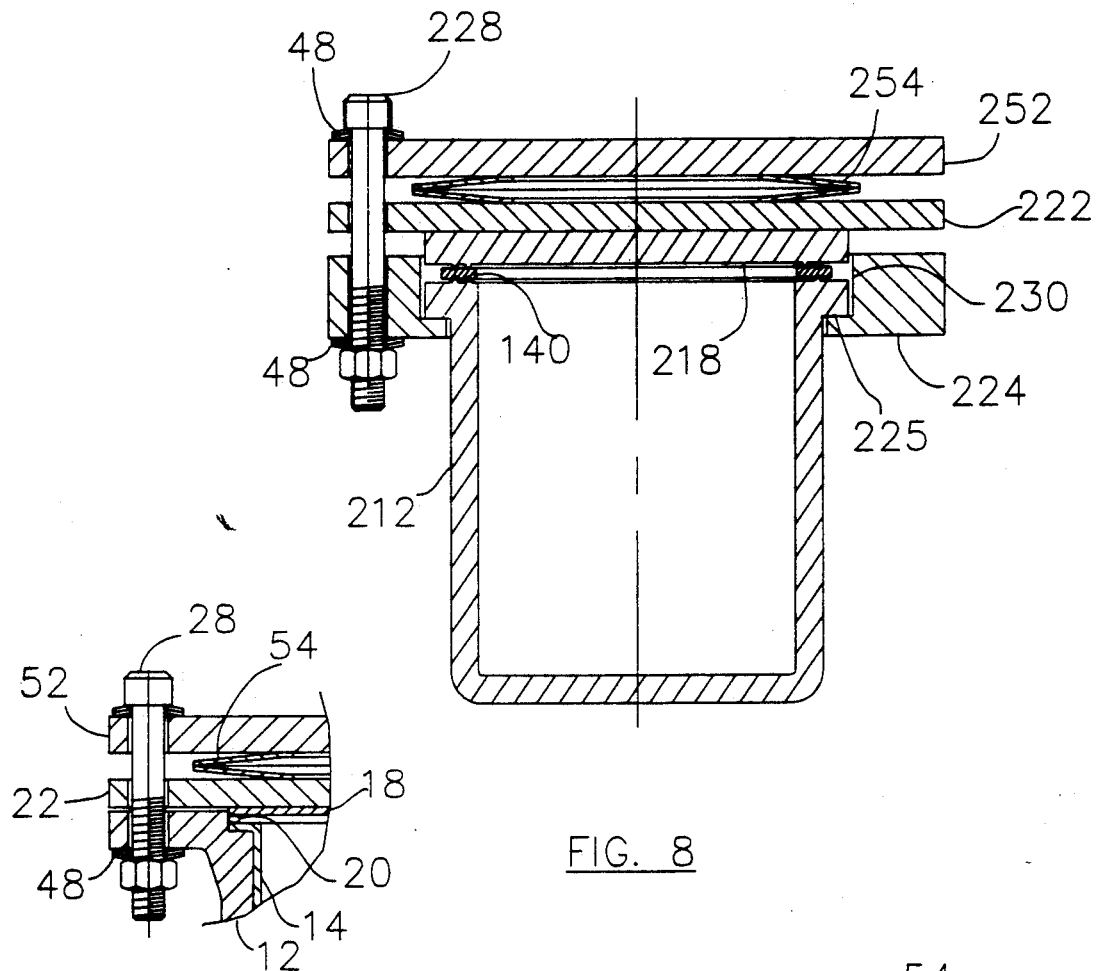
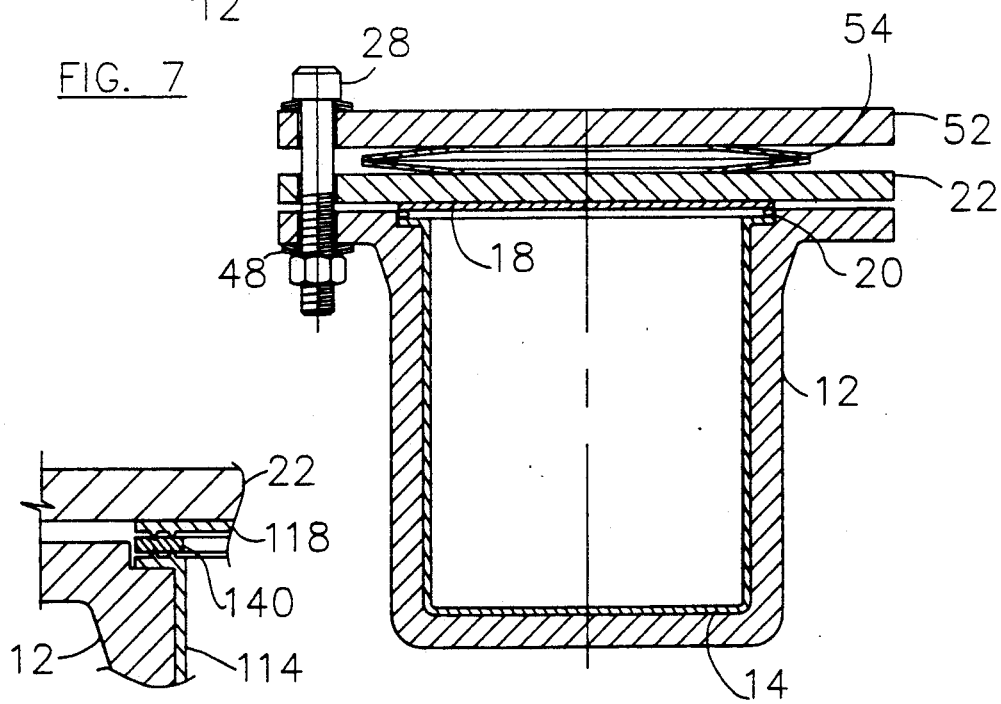
FIG. 8
FIG. 7
FIG. 6
FIG. 5

PROCESS FOR REFINING DIAMONDS

BACKGROUND OF THE INVENTION

Diamond values are determined by the four "C's": clarity, carat, color and cut. The clarity and color of a raw diamonds can be enhanced somewhat, by chemical cleaning or refining and by mechanical polishing. When the characteristic of either or both of these "C's" is improved, greater commercial potential of the diamond can be appreciated, as can its spectacular beauty.

The inventors herein have provided apparatus and a process for chemically cleaning and refining diamonds, for improving the clarity and/or sparkle and/or color thereof. The process can be used before and/or after cutting and polishing the diamond. However, because the process may be harsh on most other materials commonly used in jewelry constructions, it may be necessary to remove the gem-quality cut diamonds from their settings before subjecting them to the process.

SUMMARY OF THE INVENTION

This invention relates to apparatus and process for chemically cleaning and refining diamonds, useable both before and after the diamonds are mechanically cut, shaped and polished, but which most commonly would be used on the gem-quality cut diamond independently of and separated from its jewelry setting.

One object of the present invention is to provide apparatus suited to hold unrefined diamonds, when subjecting them to a refining process comprising the sequential exposure to specific solvents contained at high temperatures and pressures. In this disclosure, unless specified otherwise, a solvent can be any fluid that influences the surface and/or subsurface characteristics of the diamonds being refined, including caustic and acidic baths, chemical baths, and water, alcohol or other rinses.

Another object of the present invention is to provide an improved deep boiling refining process for diamonds comprising the sequential exposure to specific solvents contained at high temperatures and pressures. The process may improve the appearance, clarity, luster and value of the diamonds overall; and may also ease the effort and time needed for sorting out rough diamonds for marking, cutting, bruiting and polishing them, because of the increased clarity of the processed diamonds.

To achieve these and other objects, the present invention may provide a series of vessels, some special in construction, suited to be opened for filling with solvents and diamonds, and suited also to be sealed closed and then be subjected to heat to increase the temperatures and pressures of the contained solvents, for possibly sustained durations, for effectively deep boiling the diamonds in the solvents. The special vessels may be fabricated of specific materials and seals so as to withstand the solvents at the contained temperatures and pressures.

The present invention may also provide specific steps of processing the diamonds, using specific solvents including: isopropyl or ethyl-alcohol, acetone, hydrogen peroxide, and water for washing and/or rinsing; potassium hydroxide and/or sodium hydroxide and/or potassium nitrate for caustic refining; and sulfuric acid, hydrofluoric acid, nitric acid, and Aqua Regia for acid refining. Temperatures of the contained solvents may reach 250°–500° C., for durations measured between less than an hour and more than a day.

BRIEF DISCRIPTION OF THE DRAWINGS

Further objects, advantages and features of the present invention will appear from the following disclosure and description, including as a part thereof the accompanying drawings, in which:

FIG. 1 is a sectional view, as taken from line 1—1 in FIG. 2, of apparatus in the form of a vessel comprising part of the subject invention;

FIG. 2 is a top view of the apparatus of FIG. 1;

FIG. 3 is an enlarged sectional view, similar to FIG. 1, of a seal arrangement used with the apparatus vessel;

FIGS. 4 and 5 are enlarged sectional views, similar to FIG. 3, of alternative seal arrangements that can be used with the illustrated apparatus vessel;

FIG. 6 is a sectional view, similar to FIG. 1, showing an alternative embodiment of the apparatus;

FIG. 7 is an enlarged sectional view, similar to FIG. 6, of the seal arrangement used with the apparatus vessel; and FIG. 8 is a sectional view, similar to FIG. 6, showing yet another alternative embodiment of the apparatus.

DETAILED DESCRIPTION OF PREFERRED EMBODIMENTS OF THE INVENTION

The overall refining process will involve sequentially exposing the diamonds to different solvents at appropriate temperatures and pressures, and for appropriate durations. As part of and after each phase of the refining process, the diamonds will be rinsed throughly with suitable solvents.

An initial pre-cleaning treatment removes oils, hydrocarbons and other common surface contaminants from the diamonds. Thereafter, a caustic refining treatment breaks down and dissolves complex oxides, other "glassy" structures and metallic impurities in the diamonds. An acid refining treatment removes remaining metallic impurities by forming water soluble chlorides, nitrates, fluorides or other compounds. Between these different pre-cleaning, and caustic and acid refining treatments, the diamonds would be sequentially rinsed with water, acetone and alcohol), possibly at boiling temperatures, to remove all traces of the solvents used in the previous process treatment and avoid reaction with or comtamination of the solvents to be used in the next process treatment.

Along the same line, the process provides that preferably a different beaker or vessel will be used exclusively for each different solvent in the process, thereby providing that the diamonds would be moved sequentially from vessel to vessel.

The process also preferably provides for heating the contained solvents to elevated temperatures, of possibly 250°–500° C. However the upper limit of this range in practice is quite critical and should not be exceeded as the design temperature of solvent-containing materials used in the apparatus might otherwise be reached or exceeded; whereby accelerated or even immediate failure of the solvent containment might occur. It will become apparent that a failure of this type could significantly damage or harm the surroundings, including any nearby person.

One special form of apparatus used in the process is illustrated in FIGS. 1–3, and comprises a sealable vessel 10 having an outer pressure shell 12 and an inner liner 14. The illustrated liner 14 has an open-top and a surrounding annular sealing lip 16, a liner cover 18 having an annular sealing area opposed to the sealing lip 16, and an annular seal 20 adapted to be confined between the opposed annular sealing areas of the liner and its cover. The outer shell 12 also has an open-top and a cover 22. An annular lip 24 exists on the shell 12 underlying the opposite side of the liner lip 16, and an annular securing area 26 exists on the shell 12 and its cover 22 spaced outwardly adjacent the annular lip area 24. Securing means 28, illustrated as conventional threaded bolt and nut means extended through aligned openings spaced apart around the annular securing area 26 of the shell 12 and its cover 22, retain the components in place in the closed condition of the vessel.

The outer shell 12 and cover 22 are sizes to fit snuggly against the liner 14 and its cover 18, to structurally support them against any pressure buildup therein. When the securing means 28 are tightened, the shell cover 22 is snugged flush against the liner cover 18 which in turn is snugged against the annular seal 20 confined between the opposed annular sealing areas of the liner 14 and its cover 18. This seals the liner to withstand a pressure buildup of any fluid contained therein. The contained fluid is exposed only to the liner 14, its cover 18 and the seal 20, and is isolated from the shell 12 and its cover 22, and the securing means 28.

The seal 20 illustrated in FIGS. 1, 3, 6 and 7 when uncompressed is of a circular cross-section, similar to an O-ring. The exterior diameters of the liner lip 16, seal 20 and liner cover 18 may be sized to fit with only moderate clearance inside of a circumferential shoulder 30 extended toward the open end of the shell 12 from the annular lip 24. This locates the liner, seal and liner cover components more accurately and maintains them in proper orientation during use.

An alternative seal ring 40 (see FIG. 4) might be used, having a more squared rectangular cross-section, except for top and bottom bulged faces 42 adjacent the outside end. An annular outwardly facing recess lies between these bulged faces and a helical coil spring 44 fits in the recess. The coil spring 44 may be of stainless steel or other durable resilient material, and provides added resilient force trying to bow the sealing faces 42 tightly against the adjacent closed cover 18 and liner lip 16.

The seal 20 or 40 can be made of Teflon, which has good resistance to the solvents to be used in the refining process disclosed herein. However, a Teflon seal does creep somewhat when subjected to elevated temperatures and pressures, thereby dictating the safe upper limit operating temperature of the process when using the Teflon seal to perhaps 250° C.

A plurality of Belleville spring washers 48 can be disposed on the bolt-nut means 28, operable to reduce the adverse effect sea) creep might have on the effectiveness of maintaining the vessel sealed. After being torqued down, the spring washers 48 will more uniformly maintain the clamping pressure against the annular seal (20 or 40) over a wide seal thickness gap, and independently of temperature swings.

FIGS. 6 and 7 show the use of a separate auxiliary cover 52, and a Belleville plate compression spring 54 between the covers 22 and 52. Conventional threaded bolt and nut means 28 hold the auxiliary cover 52 tightly relative to the shell 12, aided by Belleville spring washers 48 disposed on the bolts. The plate spring 54 increases even more the allowed range of possible creep the seal 20 or 40 might experience during its use, without losing its sealing effectiveness.

An alternative metal-to-metal seal is illustrated in FIG. 5. The opposed annular sealing areas of liner 114 and its cover 118 have raised annular sealing ridges, and an annular seal 140 having opposed flat faces is fitted between these opposed annular sealing areas. The seal 140, liner 114 and cover 118 can all be made of the same material, selected to resist reaction with the solvents even at the elevated temperatures and pressures of the process.

Another alternative vessel arrangement is illustrated in FIG. 8, again using a metal-to-metal seal 140. In this arrangement, the pressure shell 212 is made of chemically resistant, structural material and of sufficient wall thickness to operate as both the pressure and sealing containment means. Thus, no liner is used, but instead the seal 140 is contained between adjacent opposed annular sealing areas of the shell 212 and its cover 218. The seal 140, shell 212 and cover 218 can all be made of the same material, resistant to the solvent to be contained therein.

FIG. 8 also illustrates a modified means for holding the shell 212 and cover 218 closed. Thus, a flanged clamp 224 underlies annular shell flange 225, structural cover 222 butts flush against the cover 218, separate auxiliary cover 252 overlies the structural cover 222, Belleville plate compression spring 254 is between the covers 222 and 252, and conventional threaded bolt and nut means 228 hold the auxiliary cover 252 tightly relative to the flanged clamp 224, aided by Belleville spring washers 48 disposed on the bolts.

The circumferential shoulder 230 on the clamp 224 has slight radial clearance from the seal 140, shell 212 and its cover 218, to help center the components relative to the vessel.

When closing each of the disclosed vessels, sealing greece should be applied to both sides of the annular seal and to both opposing annular sealing faces of the liner or shell lip and its cover, before placing the components against one another in a concentric arrangement. The seal 20, 40 or 140 should be frequently replaced, such as every few sealing and pressurizing cycles or possibly even every such cycle.

The lined vessels 12 and 212 illustrated are particularly suited for withstanding the acid refining treatment to be disclosed. The liner 14 and its cover 18 or 218) may be formed of the chemically resistant material tantalum (Ta) or platinum (Pt), but each can have a thin wall thickness as the pressure of the contained fluid will be retained by the outer shell 12 or 212 and its cover 22 or 222. Tantalum and platinum each is highly resistant to all of the strong solvent(s) used in the acid refining process, particularly the Aqua Regia.

The outer shell 12 or 212 and its cover 22 or 222 can be formed of a structural durable corrosive resistant material, such as stainless steel, and of sufficient wall thickness to withstand the pressures generated during the refining process. The structural shell and its cover can be lined on both the inside and outside surfaces with Teflon, or a glass filled Teflon, or with rubberized polytetrafluroethelyn (PTFE), to add to its resistance against corrosion caused by even accidental contact with the contained solvents, such as upon them splashing against or condensating on the surfaces.

The seal 22 or 40 can be of Teflon, while the metal-to-metal seal 140 can be made of the same material as its vessel.

The linerless pressure vessel configuration of FIG. 8 may operate with the caustic refining treatment; and the pressure-retaining shell 212 can be formed of a structural nickel alloy, and of sufficient wall thickness to withstand the pressures generated during the refining process. Its sealing cover 218 can also be formed of a nickel alloy, but of a thin wall thickness, as pressure cover 222 is provided of sufficient wall thickness to withstand the pressures generated during the refining process. The pressure cover 222 and auxiliary cover 252 can be made of normal structural chemically resistent material, such as plain or Teflon-coated stainless steel.

Other vessels used in the process can be conventional open-top beakers or vessels, with non-sealing covers; and these beakers or vessels can be formed of glass, stainless steel or Teflon-coated stainless steel.

The preferred refining process will now be outlined; and as it involves the exposure of the diamonds to the strong caustic and acidic solvents, at high temperatures and under associated high pressures, it can be identified as a "deep boiling" process. Each special vessel used during any of these steps preferably will be used exclusively with its intended solvent. Also, as the solvents used in the refining process are very corrosive and even reactionary if mixed together, care must be taken to maintain them separated during use and even thereafter for disposal. When practicing the process, any operator should use all proper safety devices, such as goggles and solvent-resistant gloves and aprons, and should only do the work within a chemically vented hood.

A) Pre-refining Cleaning Treatment

The pre-refining cleaning treatment removes many common surface impurities or contaminants from the diamonds, such as oils and hydrocarbons from the diamonds, and can be preformed in conventional open-top stainless steel or glass beakers.

Specifically, the diamonds can be piled loosely in the beaker, and acetone can be poured over the diamonds to a level at least several (1-3) centimeters over the top of the pile; and the acetone can then be gently heated to a boil and held at a boil for several (2-3) minutes, while mildly agitating the acetone occasionally during this period. The beaker can be loosely covered, and acetone can be added as needed so as to maintain the diamonds well submerged. The beaker may then be removed from the heat and placed on a cold steel plate, to cool the liquid to room temperature. The cooled acetone can then be poured off for disposal, and fresh acetone can be poured over the diamonds, gently agitated at room temperature and also poured off for disposal. The diamonds would then be washed in clean water, preferably hot or or even boiling.

The acetone-cleaned and water-rinsed diamonds are then subjected to a similar cleaning procedure, except using isopropyl or ethyl-alcohol. The diamonds again would be washed afterwards in clean hot or boiling water.

After being water-rinsed, the wet diamonds are transfered to an open-top Teflon-coated stainless steel beaker having a volume much larger (5-20 times) than the volume of the diamonds being cleaned. Concentrated sulfuric acid ($H_2SO_4$) is slowly poured onto the diamonds, to just short of covering them (80-90% coverage); whereupon hydrogen peroxide ($H_2O_2$) at 30% or stronger concentration is slowly added (drop-by-drop) into the beaker. This step may cause violent self-boiling, but such will subside in a short time. Sufficient hydrogen peroxide is added until the combined liquids completely cover the diamonds. After all of the self-boiling has stopped, the vessel is heated slowly to 140°-160° C., and held there for a short duration (2-10 minutes). The liquid is thereafter poured off for proper disposal, and the diamonds are copiously rinsed in clean water, preferably hot or or even boiling.

After being water-rinsed, the diamonds are returned to the uncoated conventional beaker and rinsed with ethyl-alcohol and air dried, with a hot air dryer or in an oven. Thereafter, the diamonds are subjected to a second acid wash in a large Teflon-coated open-top beaker, except using a mixture of hydrofluoric acid (HF) of 25-35% or greater concentration, and approximately 5-15% by volumn of fuming nitric acid ($HNO_3$). This acid wash is thereafter poured off for proper disposal and the diamonds are again copiously rinsed with clean hot or boiling water.

After this pre-refining cleaning treatment, and between the caustic and acid refining treatments to be disclosed, the diamonds sould be sequentially rinsed with water, acetone, isopropyl or ethyl-alcohol), and water again, possibly at boiling temperatures, to remove all traces of the solvents used in the previous treatment and avoid reaction with or comtamination of the solvents to be used in the next treatment.

B) Caustic Refining Treatment

An unlined structural nickel alloy vessel 212 is used for the first step of this caustic treatment, for holding the diamonds previously washed and cleaned according to the noted pre-refining cleaning treatment. Either potassium hydroxide (KOH) or sodium hydroxide (NaOH), at an aqueous concentration of 40-100% saturation, is added to the vessel to a level sufficient to cover the diamonds. In some cases, a mixture of potassium hydroxide and sodium hydroxide may produce superior results compared to using either separately. Potassium nitrate ($KNO_3$) may also be added to the bath liquid, at perhaps one part (gram) for every 5-30 parts (milliliters) of the liquid mixture. The vessel is then sealed and mechanically secured.

The sealed vessel is then slowly heated over a hot plate or in an oven to approximately 220°-500° C., and held there for an extended duration (1-3 hours to a day or more), depending somewhat on the quality of the diamonds. Thereafter, the vessel is cooled to room temperature and opened, and the liquid mixture is poured off and the diamonds are rinsed several times under hot or boiling water.

The diamonds may then be removed to unlined conventional beakers to be sequentially rinsed with hot or boiling acetone, isopropyl or ethyl-alcohol, and water again in the same manner noted above, to conclude the caustic refining treatment.

The caustic refining treatment is effective to breakdown and remove the "glassy" structures and other complex oxides in the diamonds, which frequently are easily detected visually. Examples may include silicon dioxide ($SiO_2$) or other organo metallic silicates. Thus, if a visual inspection of the treated diamonds indicates that some of these same visual imperfections yet remain in the diamonds, the caustic refining treatment step may be repeated at this time. Otherwise, the rinsed diamonds are ready for the acid refining treatment. It may be appreciated that any visual inspection may include using known conventional means such as magnifying glasses, 10× or 20× jewelry loops, or microscopes.

C) Acid Refining Treatment

A special lined vessel 10 similar to those illustrated in FIGS. 1, 3 and 5 can be used for holding the diamonds as cleaned and treated, for the acid refining treatment.

For this process, a premixed solution of Aqua Regia (hydrocholoric acid (HCl) and nitric acid ($HNO_3$), at a ratio between 1:1 and 1:5 and at full strength, is added to the vessel, to a level just covering the diamonds. In most cases, a mixture of between two and three parts hydrocholoric acid (HCl) and one part nitric acid ($HNO_3$) has produced good results. In many cases, an aqueous acid mixture of a 30-60% concentration works just as effectively. In some cases, it is beneficial to add sulfuric acid ($H_2SO_4$) to the Aqua Regia, in a ratio of perhaps one part sulfuric acid to 3-10 parts Aqua Regia. The sulfuric acid must be added slowly because of the mixing heat generated upon being combined with the Aqua Regia.

The illustrated lined vessels are suited for use with these three acids, alone or in any combination.

The vessel is then sealed and mechanically secured, and slowly heated on a hot plate or in an oven to a maximum temperature of the order of 220°-500° C., and held at this temperature for an extended duration (1-3 hours to a day or more). Thereafter, the vessel is cooled to room temperature and opened, and the liquid mixture is poured off. The diamonds are then first rinsed under running hot water, and are then placed in the conventional unlined beaker to be sequentially rinsed with hot or boiling acetone, isopropyl or ethyl-alcohol and water again in the same manner noted above.

This acid refining treatment step is effective to remove primarily metallic impurities that react in the deep boiling process with the acid solvent, to form water soluable compounds including chlorides, nitrates or fluorides that are poured off with the solvent.

The practical use of the invention will tend to be involve compromise, offsetting the advantages of using the process at higher operating temperatures and pressures for more extended durations, against the added costs needed for forming safe economical containing vessels and seals, and the potential mishaps that might result because of the over ambitious use thereof.

More specifically, when the seal is of Teflon, the upper temperature limit should not exceed approximately 250° C. particularly for an exposure longer than 10-30 hours; whereas, if the metal-to-metal seal is used, the upper temperature limit may be 400° C., for these extended durations. For shorter durations of less than an hour, a metal-to-metal seal could be used with an upper temperature limit approaching 500° C.

As the caustic refining treatment and the acid refining treatment each serves to improve the visual dullness and/or imperfections in the diamonds by correcting different potential causes of the same, either of these treatments may be emphasized and/or repeated, as an educated effort for most effectively improving the appearance of the diamonds to be treated. For example, the order of the caustic and acid treatments can be reversed, with the acid treatment preceding the caustic treatment. Also, the caustic treatment can be repeated several times, before the acid treatment step; or vice-versa.

Before the process is concluded, the diamonds must be sequentially rinsed with hot or boiling acetone, isopropyl or ethyl-alcohol and water in the same manner noted above, and should be air dried with a hot air drier or in an oven. Gem quality diamonds already cut and shaped, may now also be gently polished with a clean oil-free cloth.

The disclosed deep boiling diamond refining process has served to improve the commercial value of treated diamonds approximately 5-200 percent, compared to the same grade of diamonds when left untreated.

While specific disclosures and illustrations have been made, variations may be made therefrom without departing from the inventive concept. For example, the liner used in forming the vessel used in the acid refining treatment might titself be made thick enough to withstand the builtup fluid pressures, but cost might preclude this practically. Likewise, a zirconium based alloy might be used for forming the vessel used in the caustic refining treatment. Moreover, new materials may allow the use the process at even higher temperatures and pressures, for certain added economical benefits. The different seals and clamping arranngments might be interchanged. Accordingly, the invention is to be limited only by the following claims.

What is claimed as our invention is:

1. A deep boiling process for refining natural diamonds of gem quality, comprising the steps of
   precleaning the diamonds with solvents including alcohol, acetone, sulfuric acid, hydrogen peroxide, and/or water, to remove surface oils, hydrocarbons and other common surface impurities therefrom;
   exposing the diamonds to a caustic solvent heated in a sealed vessel to a temperature between 220° and 500° C. and contained at the associated vaporous pressures to breakdown and remove the "glassy" structures and other complex oxides in the diamonds, and then cooling the solvent, opening the vessel, and removing the diamonds from the vessel;
   exposing the diamonds to an acid solvent heated in a sealed vessel to a temperature between 250° and 500° C and contained at the associated vaporous pressures to remove impurities in the diamonds by forming water soluble chlorides and nitrates, and then cooling the solvent, opening the vessel, and removing the diamonds from the vessel; and
   rinsing the diamonds, between exposures to the caustic and acid solvents and after the last exposure to either, with solvents including water, acetone and/or alcohol and then water.

2. A deep boiling process for refining natural diamonds of gem quality according to claim 1, wherein the caustic solvent comprises potassium hydroxide (KOH) or sodium hydroxide (NaOH), individually or mixed, between full strength (anhydrous hydroxide) and diluted with water to as low 10% concentration, and submerging the natural diamonds of gem quality therein.

3. A deep boiling process for refining natural diamonds of gem quality according to claim 2, further adding potassium nitrate ($KNO_3$) to form the caustic solvent, at one part (gram) for every 5-30 parts (milliliters) of the caustic solvent liquid.

4. A deep boiling process for refining natural diamonds of gem quality according to claim 2, wherein the duration of exposure to the caustic solvent is for between approximately one hour and one day.

5. A deep boiling process for refining natural diamonds of gem quality according to claim 1, further wherein the acid solvent comprises a premixed solution of Aqua Regia [hydrocholoric acid (HCl) and nitric acid (HNO₃)], at a ratio between 1:1 and 1:5, and between full strength and diluted to a 30-60% water satuated concentration, and submerging the natural diamonds of gem quality therein.

6. A deep boiling process for refining natural diamonds of gem quality according to claim 5, further adding sulfuric acid (H₂SO₄) to the acid solvent, in a ratio of between one part sulfuric acid to 3-10 parts Aqua Regia.

7. A deep boiling process for refining natural diamonds of gem quality according to claim 5, wherein the duration of exposure to the acid solvent is for between approximately one hour and one day.

8. A deep boiling process for refining natural diamonds of gem quality according to claim 1, wherein the caustic solvent comprises potassium hydroxide (KOH) or sodium hydroxide (NaOH), individually or mixed, between full strength (anhydrous hydroxide) and diluted with water to as low 10% concentration, and submerging the natural diamonds of gem quality therein; and wherein the acid solvent comprises a premixed solution of Aqua Regia [hydrocholoric acid (HCl) and nitric acid (HNO₃)], at a ratio between 1:1 and 1:5, and between full strength and diluted to a 30-60% water satuated concentration, and submerging the natural diamonds of gem quality therein.

9. A deep boiling process for refining natural diamonds of gem quality according to claim 8, further adding potassium nitrate (KNO₃) to form the caustic solvent, at one part (gram) for every 5-30 parts (milliliters) of the caustic solvent liquid; and further adding sulfuric acid (H₂SO₄) to the acid solvent, in a ratio of between one part sulfuric acid to 3-10 parts Aqua Regia.

10. A deep boiling process for refining natural diamonds of gem quality according to claim 8, wherein the duration of exposure to the caustic solvent and the acid solvent each is for between approximately one hour and one day.

11. A deep boiling process for refining natural diamonds of gem quality according to claim 8, wherein the diamond rinsing is sequentially using water, acetone, alcohol, and water again.

12. A deep boiling process for refining natural diamonds of gem quality according to claim 8, further including having an operator visually inspect the treated natural diamonds of gem quality for visible imperfections therein and based on accumulated operator knowledge of repeating the exposure of the natural diamonds of gem quality again to either the caustic or acid solvent in the event that inspection suggests such repeated exposure might yet remove some of such visible imperfections in the natural diamonds of gem quality.

13. A deep boiling process for refining natural diamonds of gem quality, comprising the steps of precleaning the natural diamonds of gem quality with solvents including isopropyl or ethyl-alcohol, acetone, hydrogen peroxide, sulfuric acid and/or water, to remove surface oils, hydrocarbons and other common surface impurities therefrom;

submerging the diamonds in a caustic solvent comprised of potassium hydroxide (KOH) or sodium hydroxide (NaOH), individually or mixed, between full strength (anhydrous hydroxide) and diluted with water to as low 10% concentration, in a sealed vessel and heating the solvent to a temperature between 220° and 500° C. and at the associated vaporous pressures, for a duration between approximately an hour and a day, to breakdown and remove the "glassy" structures and other complex oxides in the natural diamonds of gem quality, and then cooling the solvent, opening the vessel, and removing the natural diamonds of gem quality from the vessel; and rinsing the natural diamonds of gem quality with solvents including sequentially using water, acetone, alcohol and water again, after such diamond exposure to the caustic solvent.

14. A deep boiling process for refining natural diamonds of gem quality according to claim 13, further adding potassium nitrate (KNO₃) to form the caustic solvent, at one part (gram) for every 5-30 parts (milliliters) of the caustic solvent liquid.

15. A deep boiling process for refining natural diamonds of gem quality, comprising the steps of precleaning the natural diamonds of gem quality with solvents including isopropyl or ethyl-alcohol, acetone, hydrogen peroxide, sulfuric acid and/or water, to remove surface oils, hydrocarbons and other common surface impurities therefrom;

submerging the natural diamonds of gem quality in an acid solvent comprised of a premixed solution of Aqua Regia [hydrochloric acid (HCl) and nitric acid (HNO₃)], at a ratio between 1:1 and 1:5, and between full strength and diluted to a 30-60% water satuated concentration, in a sealed vessel and heating the solvent to a temperature between 250° and 500° C. and at the associated vaporous pressures, for a duration between approximately an hour and a day, to remove impurities in the natural diamonds of gem quality by forming water soluble chlorides and nitrates, and then cooling the solvent, opening the vessel, and removing the natural diamonds of gem quality from the vessel; and rinsing the natural diamonds of gem quality with solvents including sequentially using water, acetone, alcohol and water again, after such diamond exposure to the acid solvent.

16. A deep boiling process for refining natural diamonds of gem quality according to claim 15, further adding sulfuric acid (H₂SO₄) to the acid solvent, in a ratio of between one part sulfuric acid to 3-10 parts Aqua Regia.

* * * * *